Patented Dec. 2, 1941

2,264,373

UNITED STATES PATENT OFFICE 2,264,373

COATING COMPOSITIONS

Mortimer T. Harvey, East Orange, N. J., assignor to The Harvel Corporation, a corporation of New Jersey No Drawing. Continuation of application Serial No. 43,777, October 5, 1935. This application September 2, 1939, Serial No. 293,193

3 Claims. (Cl. 106—263)

The present invention relates generally to paints, varnishes, lacquers, resins, rubber and other coating materials and to molding, impregnating and other compositions into which has been incorporated an ether of an aromatic radicle, the nucleus of which has a substituent hydrocarbon radicle having an unsaturated bond; and the present invention relates more particularly to paints, varnishes, lacquers, resins and other coating materials and to molding, impregnating and other compositions into which has been incorporated a hydrocarbon ether of an aromatic radicle, the nucleus of which has a substituent hydrocarbon radicle having an unsaturated bond, and in which the ether relation is stable and is maintained while the coating material or other composition is being prepared and exists when the same has been applied and is ready for use.

An object of the present invention is to provide a coating material having incorporated therein a material in the nature of a plasticiser or livener for coating materials which are originally hard or which may harden excessively in use, and it is a further object of the present invention to provide a coating material having a plasticiser or livener which latter will increase the life of the coating material.

Another object of the present invention is to provide a coating material or other composition having incorporated therein a hydrocarbon ether of an aromatic compound having an unsaturated hydrocarbon substituent, which ether will retain its ether relation throughout the preparation and application of the coating material and into the life of the latter.

An advantage of using a hydrocarbon ether of an aromatic compound having an unsaturated substituent on the nucleus is that, in some cases where desired, polymerization, oxidation, or condensation or combinations of these reactions can be produced at the unsaturated bond to bring about a thickening thereof, in which condition the described ether retains its characteristic as a plasticiser and livener.

Another advantage of using a hydrocarbon ether of an aromatic compound having an unsaturated substituent on the nucleus is that such an ether will set as an anti-oxidant or oxygen getter to serve as a buffer for and to protect the materials with which it is used, such as linseed oil, China-wood oil and other oils, rubber, resins and so on, and thereby prolong their life. Under conditions of use the oxidation is slow and the oxidized ether is but slightly thicker than the unoxidized and retains its character as a plasticiser.

Advantageous characteristics of the described ethers used in the practice of the present invention are that they are insoluble in ethyl alcohol and insoluble in caustic solutions and yet at the same time are soluble in (or serve as solvents for) and are plasticisers for materials such as fatty acids, linseed oil, China-wood oil and other fatty oils, rubber, rubber chlorides, rubber hydrochlorides, and resins such as phenol-formaldehyde type resins, the styrol resins and compositions, urea-formaldehyde resins, glycerine-phthalic anhydride type resins, cellulose nitrate, coumar and other artificial resins and resinous materials and natural resins such as shellac, copal, kauri, rosin and so on. Also, films and other compositions, made according to the present invention have their resistance to alkali increased to a substantial degree.

Another advantage of the described ethers of the present invention is that they are light in color and are resistant to sunlight and serve to give extended life to the gloss of materials in which they are used when exposed to the outdoor elements.

Another advantage of the use of the described ethers in the compositions of the present invention is the high electric resistance of said ethers and of the materials into which they are incorporated.

The coating materials containing stable ethers as above described have improved characteristics of elasticity, flexibility, toughness to the degree of being hard without being brittle, and resistance to solvents, acids, alkalis and chemicals in general.

Other objects and advantages of the present invention will be apparent from the foregoing illustrative examples of the practice of the present invention and from the claims forming part thereof.

According to the present invention the stable ethers are incorporated into paint, varnish and lacquer vehicles and other compositions with or without heat treatment of the ether, with or without oxidation and with or without polymerization of the ether with a polymerizing agent or in combinations of any two or more of such untreated and treated ethers.

Heating of the above described stable ethers causes thickening thereof, to various degrees for various ethers, and this thickening results from oxidation or from polymerization or both at the unsaturated bond in the substituent radicle of the aromatic nucleus. The oxidation can be brought about also with the use of driers such as are used for paint vehicles and varnish bodies, such as litharge, manganese resinate, copper oleate and so on, usually with the aid of heat. And also the polymerization can be brought about with the aid of polymerizing reagents such as sulphuric acid, aluminum chloride, phosphoric acid, hydrochloric acid and so on. In all these reactions a thickening occurs and it is considered that the oxidation and the polymerization products and the products however organized are ethers and it is the stability of these stable ethers and of the ether bodies derived therefrom that give the desired characteristics to the products of the present invention.

In order to expedite the heregoing disclosure of the present invention illustrative examples of aromatic nuclei, of unsaturated substituent radicles on the aromatic nuclei, and of the other hydrocarbon radicle of the ether, together with a few specific examples of the ethers themselves are given as follows. The aromatic nucleus can be phenyl, naphthyl, anthranyl, etc. and the ethers thereof can be monoethers (e. g. ethyl cardanol) or polyethers (e. g. diethyl urushiol). The unsaturated hydrocarbon substituent can be those substituent radicles present in the anacardic acid and cardol constituents of cashew nut shell liquid; those present in anacardol ($C_{18}H_{30}O$) and the other aralkyl compounds present in marking nut shell liquid; the hydrocarbon substituent in urushiol (Japanese lac); the hydrocarbon substituent in indene; also the following radicles, the crotyl, allyl, the methyl and other derivatives of the allyl, the vinyl, the propenyl, the isopropenyl and the several normal and iso alkyl and alkoxy derivatives of the vinyl, propenyl and allyl (e. g. methyl and methoxy), and the cyclohexene radicle. These radicles classed generally are aliphatic and cyclo unsaturated hydrocarbons, having an unsaturated bond at any place in the radicle.

Examples of the hydrocarbon radicles which are joined to an aromatic nucleus through the ether oxygen are the primary normal and isomeric radicles, methyl, ethyl, propyl, butyl, amyl and other homologues, and the secondary propyl, butyl, amyl and homologous radicles, in the various isomeric relations, the phenyl, and the naphthyl.

Illustrative examples of the stable ethers suitable in the practice of the present invention and included among the ethers which are comprised of the radicles above enumerated as examples are the ethyl ether of cashew nut shell liquid; the ethyl ether of cardanol ($C_2H_5OC_6H_4C_{14}H_{27}$); the ethyl ether of marking nut shell liquid; diethyl urushiol; the primary and secondary amyl ethers of cardanol ($C_5H_{11}OC_6H_4C_{14}H_{27}$); and ethers of substituted phenols naturally occurring in the Anacardiaceae family generally and those obtainable by driving off the carboxyl radicle of carboxy phenolic compounds occurring in this family of trees and plants; o-vinyl phenyl ethyl ether ($C_2H_5OC_6H_4CH:CH_2$); o-vinyl phenyl primary amyl ether; o-allyl phenyl primary amyl ether; ortho crotyl phenyl primary amyl ether; secondary propyl ether of cardanol; o-vinyl phenyl secondary amyl ether; para allyl phenyl ethyl ether; beta-allyl naphthyl ethyl ether; the ethyl ether of indene with the ether connection on the benzene nucleus; ortho cyclohexene phenyl ethyl ether; phenyl ether of allyl phenol.

The stable ethers suitable for the practice of the present invention can be generally described as being the primary normal and isomeric alkyl, the secondary alkyl, the phenyl and the naphthyl ethers of a phenol having an unsaturated hydrocarbon substituent of from ten to twenty carbon atoms. As illustrative examples of coating materials of the present invention the following are given:

Example I

A varnish for coating fabric as for making electrical insulating varnished cambric is made as follows:

About two hundred pounds of the ethyl ether of cashew nut shell liquid is heated to about 600° F. and six pounds of litharge added after which one hundred and fifty pounds of China-wood oil are added. The temperature is then held at about 500° F. for about five hours to get a desired body after which the batch is allowed to cool and fifty pounds of linseed oil are added and the temperature brought up to about 450° F. at which point six pounds of manganese resinate are added. The batch is then thinned with about fifty gallons of petroleum solvent.

Example II

A vehicle for paints for inside and outside purposes and for general use is as follows:

About eighty parts by weight of linseed oil which has been polymerized in a vacuum, twenty parts of heat thickened China-wood oil, ten parts of the di ethyl ether of urushiol and four parts of liquid driers are mixed at normal temperature and a pigment of the desired color ground in. This vehicle is especially valuable for white pigments because of its lightness of color and because of the durability of its lightness of color and of the long life of the film. Petroleum solvent is added to give about fifty per cent solids.

Example III

About ninety parts by weight of polymerized linseed oil, ten parts of ethyl cardanol, and four parts of liquid driers are mixed together at normal temperatures and a pigment ground in. Like the vehicle of Example II, this vehicle is especially suited to white and to light colors. Solvent is used to about fifty per cent solids.

Example IV

About six hundred parts by weight of phenol formaldehyde rosin ester, eight hundred parts of the ethyl ether of cashew nut shell liquid, three hundred parts of China-wood oil, and one hundred parts of linseed oil are heated up to about 600° F. and the temperature dropped to about 475° F. where it is held for a desired body, when two per cent of liquid driers are added. Thin with a solvent to the desired amount, 40% to 60% solids. This serves as a baking varnish for metals, on which it can be baked at about 300° to 400° F. for about one-half hour. Among other uses, it is suitable as a baked coating for tin plate in cans, bottle caps and so on.

Example V

About one hundred parts by weight of cashew nut shell liquid ethyl ether are heated at about 600° F. for about two hours to get a slight body, after which one hundred parts of China-wood oil are added and the batch held at about 475° F. for a desired body. One per cent each of liquid driers and manganese resinate are added and solvent (e. g. petroleum spirits) added at about 300° F. to about fifty per cent solids. This varnish is useful for coating cloth, paper and metal, being set in heating towers or baked in an oven at about 300° to 400° F. according to speed of drying desired and the nature of the material to which it is applied. The dried varnish film has good dielectric characteristics, low power factor, and is especially good in its resistance to alkalis, oils and solvents.

Example VI

To a solution of cellulose nitrate is added the ethyl ether of allyl phenol, in amount about five per cent of the weight of the cellulose nitrate in said solution. This material is suitable for coatings generally, and is useful for electrical insulation and for coating metals.

Example VII

About one part of shellac by weight and one part by weight of the ethyl ether of cashew nut shell liquid are heated together to about 600° F. and, on cooling, thinned with a solvent such as petroleum spirit (such as a cut between gasoline and kerosene). This material is suitable, among other uses, as an enamel for tin plate on which it can be baked at about 300° to 400° F. in about one-half hour.

Example VIII

The ethyl ether of cardanol is polymerized with about 15% of aluminum chloride at normal temperature or higher (e. g. up to 200° F.) and cured for fifteen hours at about 270° F., after which it is washed to remove the aluminum chloride. This polymer can be milled into rubber, for example, about two parts by weight of the polymer to one part of rubber, and the mixture used as rubber is used with or without fillers and with or without vulcanizers, for example, sulphur five per cent of the mixture. Among other uses this polymer-rubber mixture is good for electrical insulation.

General example

In any of the above given examples, the ether used, hydrocarbon ether of an aromatic nucleus having an unsaturated substituent, can be polymerized by suitable reagents before or after its incorporation with the other materials which go into the final product. Examples of suitable polymerizing chemicals are sulphuric acid, hydrochloric acid, phosphoric acid, aluminum oxide, aluminum chloride, zinc chloride, phosphorus oxychloride.

The heating of ethers of cashew nut shell liquid and of ethers of phenolic derivatives of cashew nut shell liquid together with drying oils and with shellac are considered to bring about a chemical reaction between the ether used and the drying oil or shellac, particularly as described in Examples I, IV, V and VI, above. And this is the case where the polymerized ether described in the general example is substituted for the unpolymerized ethers of Examples I, IV, V and VI.

The materials of the present invention have unusual alkali resistance and a high resistance to petroleum oils.

The cardanol ethers and the cashew nut shell liquid ethers mentioned herein are obtainable on the market.

This application is a continuation of my co-pending application Serial Number 43,777, filed October 5, 1935.

Having thus described my invention, what I claim and desire to protect by Letters Patent is:

1. A coating composition adapted to be applied as a liquid film and to dry when so applied and comprising essentially a drying oil and an alkyl ether of a phenol derived from cashew nut shell liquid and which phenol ether has characteristic unsaturated hydrocarbon side chain of cashew nut shell liquid.

2. A coating composition adapted to be applied and dried as a liquid film and comprising essentially a drying oil and a primary alkyl ether of cashew nut shell liquid.

3. A varnish containing a drying oil and a primary alkyl ether of cashew nut shell liquid as the essential ingredients of the body thereof, the dried film of said varnish having electrical insulating properties.

MORTIMER T. HARVEY.